United States Patent [19]

Beffa

[11] 4,427,585
[45] Jan. 24, 1984

[54] 1:2 CHROMIUM AND COBALT COMPLEX DYES

[75] Inventor: Fabio Beffa, Riehen, Switzerland

[73] Assignee: Ciba-Geigy Corporation, Ardsley, N.Y.

[21] Appl. No.: 287,020

[22] Filed: Jul. 27, 1981

[51] Int. Cl.³ .................... C07C 107/108; C09B 45/14
[52] U.S. Cl. ................................. 260/151; 260/145 A
[58] Field of Search ............................ 260/145 A, 151

[56] References Cited

U.S. PATENT DOCUMENTS

| | | | |
|---|---|---|---|
| 2,610,175 | 9/1952 | Widmer et al. | 260/145 A |
| 2,673,199 | 3/1954 | Widmer et al. | 260/145 A |
| 2,776,956 | 1/1957 | Zickendraht et al. | 260/145 A |
| 2,813,853 | 11/1957 | Steinemann | 260/145 A |
| 2,871,233 | 1/1959 | Pfitzner et al. | 260/145 A X |
| 2,970,137 | 1/1961 | Whitlock | 260/145 A |
| 3,432,485 | 3/1969 | Neier | 260/151 X |
| 4,000,965 | 1/1977 | Mennicke et al. | 260/145 A X |

FOREIGN PATENT DOCUMENTS 802458  10/1958  United Kingdom ........... 260/145 A

*Primary Examiner*—Helen M. S. Sneed
*Attorney, Agent, or Firm*—Edward McC. Roberts

[57] ABSTRACT

1:2 Metal complex dyes of formula I

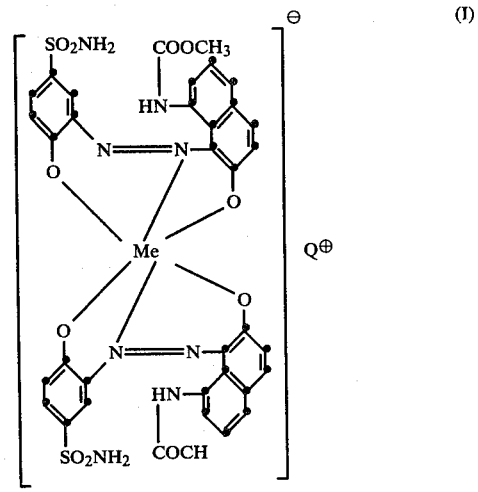

and mixtures thereof with the metal complex dyes of formulae II and III

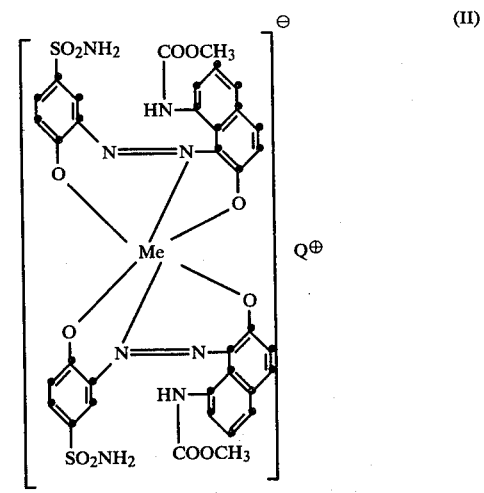

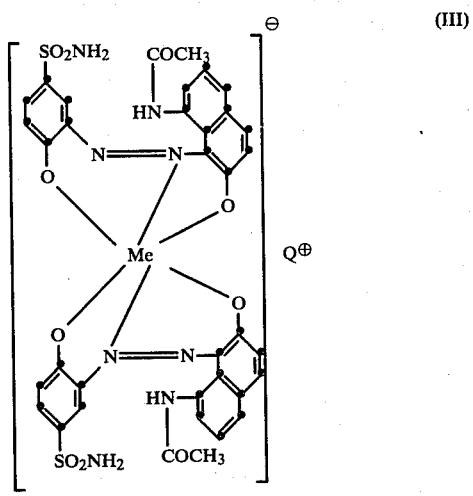

wherein Me is chromium or cobalt and $Q^\oplus$ is a cation. The dyes and dye mixtures are suitable for dyeing and printing natural or synthetic polyamide material. Printing pastes and padding liquors prepared from these dyes or mixtures have no tendency to gel.

3 Claims, No Drawings

1:2 CHROMIUM AND COBALT COMPLEX DYES

The present invention relates to 1:2 metal complex dyes of the formula I

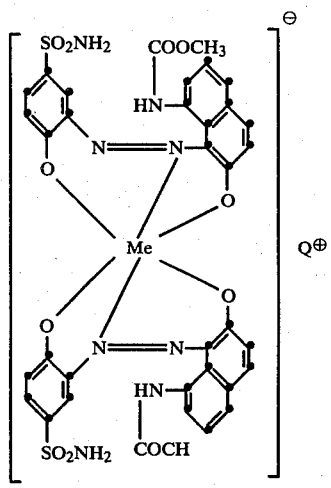

wherein Me is chromium or cobalt and $Q^{\oplus}$ is a cation, and mixtures thereof with the metal complex dyes of the formulae II and III

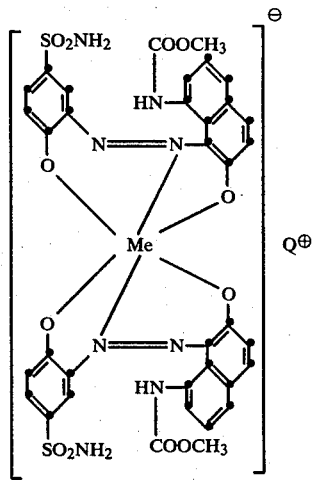

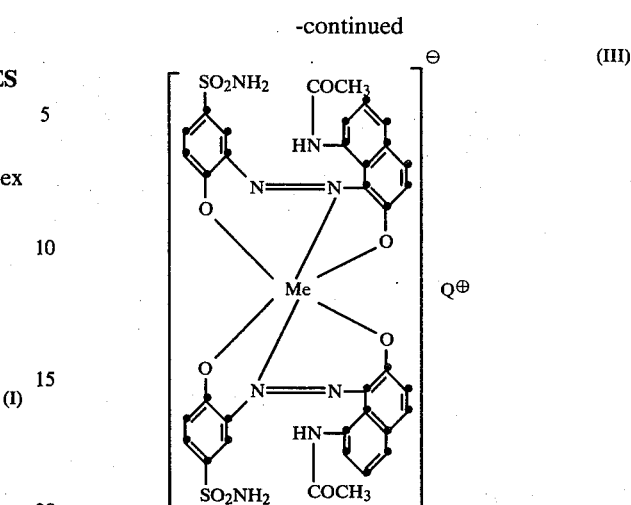

wherein Me and $Q^{\oplus}$ have the above meanings. $Q^{\oplus}$ is the cation of an alkali metal, in particular a sodium or lithium cation, or is also an ammonium ion or the cation of an organic amine, e.g. of triethanolamine.

The symmetrical chromium complexes of the above formulae II and III are known. The 1:2 chromium or cobalt complexes of the formula II gel in conventional padding liquors or printing pastes, so that these are normally unfit for use. The wetfastness properties of the 1:2 chromium complex dye of the formula III are not satisfactory in all respects.

Accordingly, it is the object of the present invention to provide similar dyes which do not have these drawbacks. This object is accomplished by means of the dyes and/or dyestuff mixtures of this invention. Surprisingly, padding liquors or printing pastes containing the 1:2 chromium complex dye of the formula I, or mixtures of the 1:2 chromium or cobalt complex dyes of the formulae I, II and III, do not gel, and the wetfastness properties are better than those of the 1:2 chromium complex dye of the formula III.

Preferred metal complex dyes of the formula I, and mixtures thereof with the metal complex dyes of the formulae II and III, are the chromium complex dyes.

The mixtures of the metal complexes of the formulae I, II and III are obtained e.g. by reacting a mixture of the azo dyes of the formulae IV and V

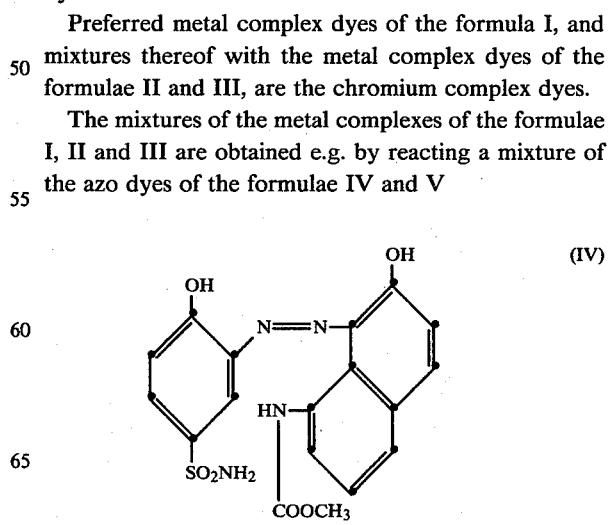

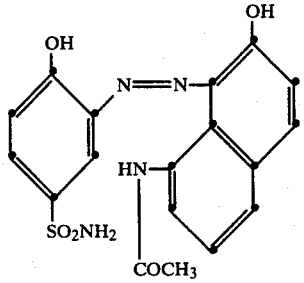

(V)

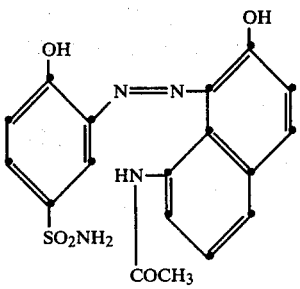

(V)

with a cobalt or, preferably, a chromium donor. The reaction is carried out by suspending the azo dyes of the formulae IV and V in water, an organic solvent or a mixture of water and an organic solvent, adding a chromium or cobalt donor, stirring the mixture preferably in the temperature range from 80° to 100° C., and adjusting the pH to a value between 6 and 9.

The composition of the mixture can be varied by appropriate choice of the ratio of the dyes of the formulae IV and V employed for the metallisation. It is preferred to use both dyes in the molar ratio of 35:65 to 65:35, in particular 45:55 to 55:45.

The pure asymmetrical chromium complex dye of the formula VI (VI)

wherein Q⊕ is a cation, is obtained by first preparing the 1:1 chromium complex of the dye of the formula IV

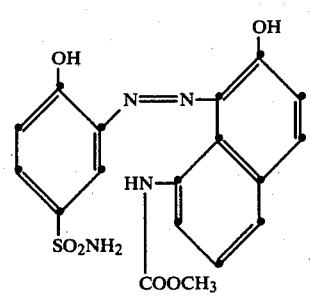

(IV)

or the 1:1 chromium complex of the dye of the formula V and then reacting this complex with the dye of the formula V or IV to give the 1:2 chromium complex dye of the formula VI, which constitutes a preferred embodiment of the dyes of the present invention. This reaction is carried out by suspending the 1:1 chromium complex of the dye of the formula IV or V in water, an organic solvent or a mixture of water and an organic solvent, adding the dye of the formula V or IV, stirring the mixture in the temperature range from 80° to 100° C., adjusting the pH to a value betweeen 6 and 9, and, finally, isolating the 1:2 chromium complex dye of the formula VI from the reaction solution.

The metallisation is carried out by conventional methods, e.g. with cobalt sulfate or cobalt acetate or with sodium chromosalicylate, in neutral or weakly alkaline solution. To obtain the dyes of the formula VI it is preferred to prepare first, in acid solution, the 1:1 chromium complex of the azo compound of the formula IV or V and then to react this 1:1 complex, in neutral to weakly alkaline medium, with the azo compound of the formula V or IV.

Examples of suitable organic solvents are ketones, e.g. methyl isobutyl ketone, or alcohols, e.g. glycol or butanol.

The metal complex dyes obtainable by the above process are isolated in the form of their salts, preferably their alkali metal salts, most preferably sodium or lithium salts, or also ammonium salts or salts or organic amines having a positively charged nitrogen atom, and they are suitable for dyeing and printing a variety of fabrics, especially for dyeing nitrogen-containing fabrics such as silk, leather and, in particular, wool, as well as synthetic fibres made from polyamides or polyurethanes. They are suitable, in particular, for dyeing from a weakly alkaline, neutral or weakly acid bath, e.g. from a bath containing acetic acid. The dyeings obtained are level and have good fastness to light, washing, water, hot water, fulling, decatising and carbonising.

The 1:2 chromium complex dyes of the formula I, and the mixtures of the 1:2 chromium or cobalt complex dyes of the formulae I, II and III, are of particular advantage when used in aqueous padding liquors or printing pastes, as no problems due to gelling occur.

The padding liquors or printing pastes usually contain further ingredients, e.g. wetting agents, antifoams, or agents which affect the properties of the fabric, e.g. softeners, flame retardants, or dirt, water and oil repellents, especially, however, natural or synthetic thickeners.

Examples of suitable neutral thickeners are carob seed gum ether, starch ether, alginates, starch, tragacanth, carboxymethyl cellulose and cellulose ethers. Examples of suitable synthetic thickeners are high molecular mono- or copolymers of acrylic acid, methacrylic acid or maleic acid, with ethylenically unsaturated comonomers such as ethylene, butadiene, hydroxyalkylacrylates, divinyldioxane and divinylbenzene, in the form of water-soluble alkali metal, ammonium or amine salts.

The pad dyeing or printing is carried out by conventional methods.

The invention is illustrated by the following Examples, in which parts and percentages are by weight, unless otherwise stated.

EXAMPLE 1

20.8 parts of the dye of the formula IV

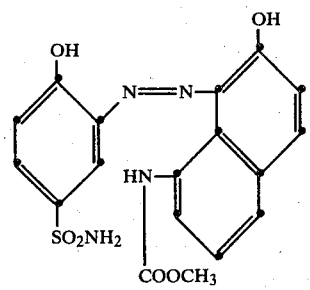

and 20 parts of the dye of the formula V

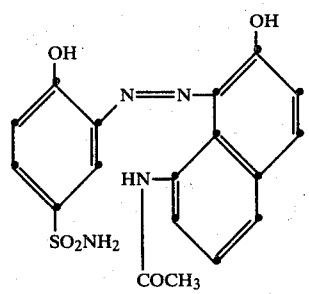

are heated in a reflux condenser, in 800 parts by volume of water, with 156 parts by volume of a solution of sodium chromosalicylate (=3.25 parts of chromium), until the starting dyes can no longer be detected. The mixture of chromium-containing dyes is salted out of the resultant dark bluish-grey solution with sodium chloride. The precipitate is isolated by filtration and dried, affording a bluish-black powder which is soluble in hot water and dyes wool from a neutral to weakly acid dye bath in grey shades of good fastness properties.

Grey dyestuff mixtures having similar properties are obtained by replacing, in this Example, 20.8 parts of the dye of formula IV and 20 parts of the dye of formula V by the amounts indicated in the following table:

| No. | Dye of the formula IV | Dye of the formula V |
|-----|----------------------|----------------------|
| 1   | 16.6 parts           | 24 parts             |
| 2   | 18.7 parts           | 22 parts             |
| 3   | 22.9 parts           | 18 parts             |
| 4   | 24.9 parts           | 16 parts             |

EXAMPLE 2

20.8 parts of the dye of formula IV and 20 parts of the dye of formula V are stirred in 800 parts by volume of water with 14.8 parts of cobalt sulfaheptahydrate (=3.1 parts of cobalt) at 90°–95° C. until no more starting dye can be detected, while keeping the pH of the reaction mixture at about 7 by addition of approx. 5N sodium hydroxide. The mixture of cobalt-containing dyes is then precipitated with sodium chloride solution. The precipitate is isolated by filtration and dried, affording a dark powder which dyes wool from a neutral to weakly acid bath in very fast corinth shades.

A dyestuff mixture having similar tinctorial properties is obtained by replacing, in this Example, the 20.8 parts of the dye of formula IV by 22.9 parts of the same dye and the 20 parts of the dye of formula V by 18 parts of the same dye.

EXAMPLE 3

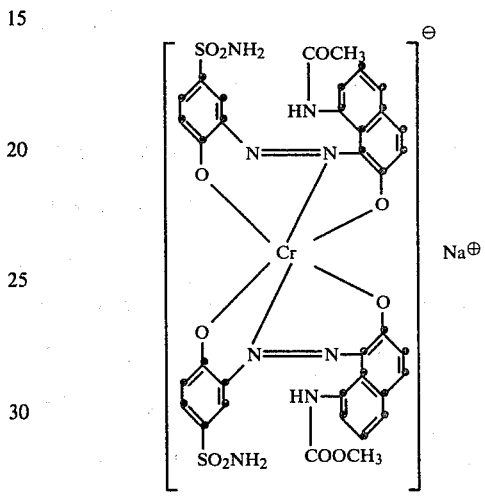

23.3 parts of the 1:1 chromium complex compound corresponding to 2.6 parts of chromium and 20.8 parts of the monazo dye of the formula IV (obtained by methods known per se, e.g. by chroming the monazo dye in butanol with chromium chloride hexahydride) and 20 parts of the monazo dye of the formula V, are suspended in 250 parts by volume of ethylene glycol. The mixture is heated to 80°–85° C., while simultaneously raising the pH of the suspension to 7–7.5 with 5N NaOH, and is kept at this temperature and constant pH (with further addition of 5N NaOH) until the starting materials can no longer be detected. The chromium-containing dye of the above formula is then precipitated with sodium chloride solution. The precipitate is isolated by filtration and dried, affording a dark powder which forms a grey solution in water and dyes wool in fast grey shades.

EXAMPLE 4

A printing paste of the following composition is prepared:

| | |
|---|---|
| 30 g | of the dyestuff mixture of Example 1 |
| 50 g | of thiodiglycol |
| 260 g | of boiling water |
| 100 g | of urea |
| 500 g | of thickener solution based on carob bean gum |
| 60 g | of ammonium tartrate (15° Bé) |
| 1000 g | |

This paste is most suitable for printing on account of its consistency and keeps its good properties even after standing for several days. It does not gel.

A wool or polyamide fabric is printed with this paste and steamed for 20-30 minutes at 0.2 bar (102°-104° C.). The grey printed fabric has good fastness properties, especially wetfastness.

Replacing the dyestuff mixture of Example 1 by the same amount of the symmetrical 1:2 chromium complex of the dye of formula VI gives a printing paste which gels strongly and is therefore no longer fit for printing.

EXAMPLE 5

2 parts of the dyestuff mixture of Example 1 are dissolved in 4000 parts of water. Into this bath are put 100 parts of wool at 50° C. and then 3 parts of ammonium acetate are added. The bath is then heated over 45 minutes to the boil and kept at this temperature for 1½ hours, while turning the wool well in the bath. The wool is subsequently rinsed and dried. It is dyed in a grey shade of good fastness properties.

What is claimed is:

1. A 1:2 metal complex dye of the formula I

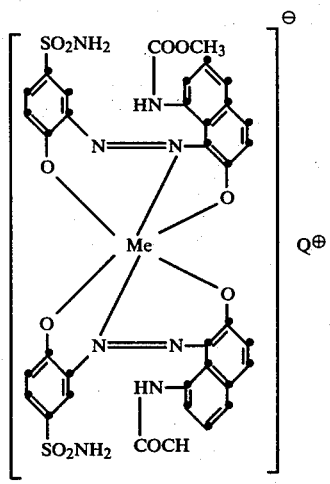

wherein Me is chromium or cobalt and Q⊕ is a sodium ammonium or triethanolamine cation, or a mixture thereof with the metal complex dyes of the formulae II and III

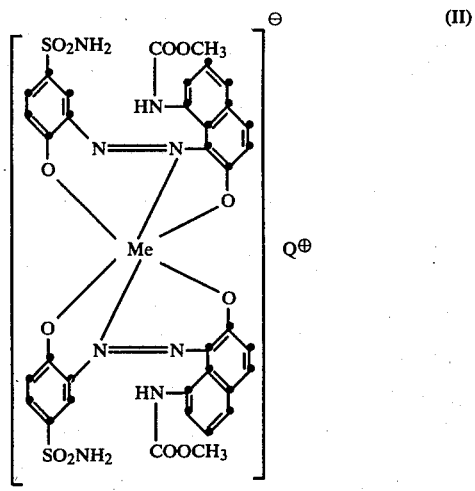

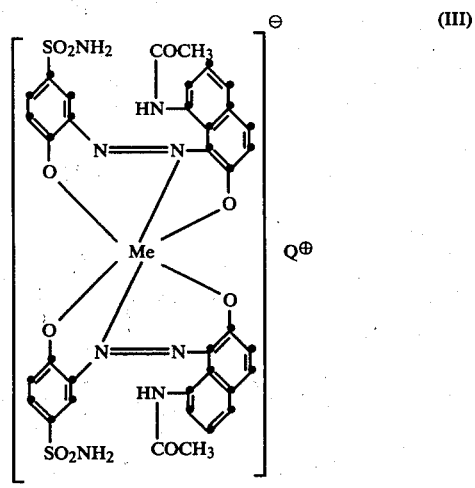

wherein Me and Q⊕ have the above meanings.

2. A metal complex dye of the formula I, or a mixture thereof with the metal complex dyes of the formulae II and III, wherein Me is chromium.

3. A 1:2 chromium complex dye of the formula VI

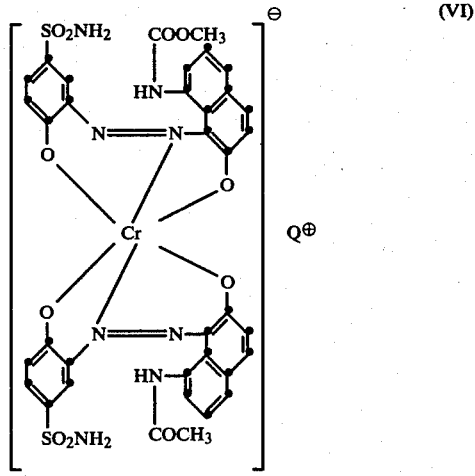

wherein Q⊕ is a sodium ammonium triethanolamine or cation.

* * * * *